United States Patent [19]
Adams et al.

[11] Patent Number: 6,154,730
[45] Date of Patent: Nov. 28, 2000

[54] FACILITY-BASED FINANCING SYSTEM

[76] Inventors: Edward S. Adams, 2010 W. 49th St., Minneapolis, Minn. 55409; Philip M. Goldman, 1926 South La., Mendota Heights, Minn. 55118

[21] Appl. No.: 09/175,822

[22] Filed: Oct. 20, 1998

Related U.S. Application Data

[60] Provisional application No. 60/064,652, Oct. 20, 1997.

[51] Int. Cl.⁷ ...................................................... G06F 17/60
[52] U.S. Cl. ................................. 705/35; 705/36; 705/40; 705/45
[58] Field of Search .................................. 705/35, 36, 40, 705/45; 52/9, 8, 10

[56] References Cited

U.S. PATENT DOCUMENTS

| | | | |
|---|---|---|---|
| 5,812,988 | 9/1998 | Sandretto | 705/36 |
| 5,940,810 | 8/1999 | Traub et al. | 705/36 |

FOREIGN PATENT DOCUMENTS

| | | |
|---|---|---|
| 2079721 | 1/1982 | United Kingdom . |

OTHER PUBLICATIONS

Davis Scott S., Financing a recycling/ MSW composting Facility, pp. 1–4, Feb. 1992.

Kamenetsky, Hannah, Bonds to partially fund new Louisville, Ky., football stadium, pp. 1, Feb. 1996.

Carroll, Edmund, Investor surveys and the discount Rate, pp. 1–7, Sep. 1992.

Fitzgerald, John C., How Infrastructure Financing Trends Affect Housing Affordability, pp. 1–4, Feb. 1992.

Business Wire, Jul. 30, 1998, "Bear Stearns Sells First–Ever Asset Backed Financing for a Sports Facility".

Stadium & Arena Financing, Mar. 8, 1999, "Fitch Sets Arena Debt Criteria".

AP Online, Apr. 27, 1998, "MLB's Future Revenues Secure Loans".

Entertainment Law & Finance, Aug. 1997, "David Bowie $55 Million Haul; Using a Musician's Assets to Structure a Bond Offering".

The San Francisco Examiner, Mar. 25, 1997, "Smart Bonds; David Bowie's brokers set their sights on Silicon Valley's intellectual property".

San Antonio Express–News, Dec. 15, 1998, "Taxpayers won't pay for Denver's Pepsi Arena".

Private Placement Letter, Nov. 2, 1998, "Stadium Finance to Grow Within ABS Market".

*Primary Examiner*—James P. Trammell
*Assistant Examiner*—Mussie K. Tesfamariam
*Attorney, Agent, or Firm*—Fredrikson & Byron, P.A.

[57] ABSTRACT

A system for employing the projected receipts of a public facility to finance the construction of the facility itself, or the acquisition of a team to play in the facility. A preferred system includes: a method for projecting future cash flows (e.g., gate receipts) associated with the operation of the facility; pooling rights to receive those cash flows; transferring the pooled rights to a special purpose vehicle; and issuing securities on behalf of the special purpose vehicle in order to generated revenues for the construction and/or operating costs of the facility, or for the purchase of the team itself. The system also includes a computerized method for the ongoing implementation of such a financing system, including the steps of: inputting estimated cash flows and actual cash receipts; comparing the estimated and actual values in order to determine adjusted amounts to allocate between investors in the special purpose vehicle and ongoing operations. The invention farther provides a facility (such as a stadium) and/or a team funded or acquired by such a system.

17 Claims, No Drawings

FACILITY-BASED FINANCING SYSTEM

This a continuation of Provisional Application No. 60/064,652 Oct. 20, 1997.

TECHNICAL FIELD

The present invention relates to methods such as computerized methods for creating or employing financing mechanisms. In another aspect, the invention relates to methods for securitizing assets as a financing mechanism.

BACKGROUND OF THE INVENTION

Governmental entities and private owners are becoming increasingly confronted with dilemmas posed by professional sports teams. In particular, many governmental and business entities are currently involved in prolonged discussion and debate over the operation or construction of new stadiums, as well as the relocation and/or purchase of the teams themselves.

The Minnesota Twins, for instance, have recently announced the signing of an agreement to sell the team to an out-of-state owner, unless the Minnesota legislature or some private entity either approves or funds the construction of a new stadium. Clearly a decision on the part of the legislature will depend heavily on the state's ability to establish and agree upon an appropriate financing mechanism. Options that have been discussed include gambling, cigarette taxes, etc. Each of these options, however, carries considerable public disfavor and political risk. On the part of a private entity, the funding decision involves finding an effective low cost financing mechanism to fund such a large facility.

What is clearly needed are creative methods for financing such projects in a manner that is palatable to the public or the team's owners or buyers, acceptable to investors, and above all, effective at raising the necessary level of funding in a politically acceptable manner.

SUMMARY OF THE INVENTION

The present invention provides a system for financing a stadium facility to be constructed an/or operated by an originating entity and/or for financing a team to play in such a facility. In one aspect, the system involves a computerized system for:

a) projecting one or more sources of future cash flow expected to be generated by the originating entity in the operation of the facility, said sources preferably being selected from the group consisting of gate receipts, season ticket revenue, individual game ticket revenue, and vending revenue;

b) collecting and pooling rights to receive said cash flow(s) over a period of years;

c) transferring said rights to one or more special purpose vehicles, each in the form of a separate legal entity, in a manner that effectively removes the respective cash flow(s) from the originating entity's bankruptcy estate;

d) issuing securities on behalf of said special purpose vehicle(s), using said pooled rights as collateral; and e) employing the revenue generated from the sale of said securities to finance at least a portion of the construction and/or operating costs of the facility and/or a portion of the purchase price of the team itself.

In a preferred embodiment, the system further provides a number of optional, but preferred, features, including for instance means for predicting the likely dollar amount of the future cash flows and the inherent risks of amounts less those said cash flows being received. Preferably the system further provides means for insuring that investors in the special purpose vehicle receive the maximum amount possible if cash flows are less than expected, and that they are insured or provided credit enhancement against such risk. In a related vein, the system further employs one or more risk prediction methodologies to predict the aggregate risk of default by the special purpose vehicle.

In yet another preferred embodiment, the system includes a quantitative analysis of the expected cumulative net loss experience or cash flow experience for the securitized asset. Optionally, the system further provides means for issuing credit support from an issuer, e.g., in the form of the purchase of a subordinated security in the special purpose vehicle by the seller or overcollateralization.

In another aspect, the invention provides a facility that has been financed and/or a team that has been purchased, at least in part, by the system described herein. In a preferred embodiment, the public or private facility is a stadium, and in a particularly preferred embodiment the team is the Minnesota Twins and the stadium is a ballpark located in Minneapolis or St. Paul, Minn. Most preferably, the ballpark is provided in the form of an open air stadium having a retractable roof, located on or near the Mississippi riverfront.

DETAILED DESCRIPTION

The system of this invention will be further described with reference to a preferred embodiment. It is understood, however, that this embodiment is intended for illustrative purposes only, and is not intended or to be taken as unduly limiting the scope of this invention.

The above-described system is typically employed at the beginning of a the process of structuring the financing of a particular facility or team purchase. Once this financing mechanism is established, and the facility (e.g., stadium) constructed (or team acquired), the invention further provides a computerized method for implementing the securitized financing mechanism on an ongoing basis. This method of identifying and establishing securitized assets, as well as the computerized method for implementing those assets on an ongoing basis, together make up a system (referred to as "STAFI" herein, for "STAdium FInancing") of this invention. The STAFI system, in turn, can include a number of other optional components, including additional or ancillary computerized steps, as described herein.

In a particularly preferred embodiment, the ongoing implementation is performed using a computerized method to be used as a tool by a servicer on behalf of the special purpose vehicle. This implementation method preferably provides computerized means for: (1) estimating or inputting cash flows generated by the selected cash flow source (e.g., future ticket and vending sales) which are needed to obtain funds through securitization (e.g., borrowing the money and using the future cash flows as collateral); (2) ensuring that investors are paid appropriately from cash flows generated by ticket and vending sales; (3) making payments on an ongoing, periodic basis into the special purpose vehicle to provide credit enhancement for the investors; and (4) adjusting cash flow estimates on a periodic basis (e.g., daily, weekly, monthly, or annual), to take into account discrepancies between actual and estimated cash flows (e.g., in the event local and/or national attendance variances from those predicted and/or anticipated ex ante).

In a preferred embodiment, e.g., for funding the construction of a sports stadium, STAFI provides for the securitization of the future cash flows generated in the operation of the facility in the following manner. STAFI provides means for predicting the required receipts or cash flows and the purchase by the System Operator of the requisite cash flows from the appropriate party or entity. STAFI has the ability to employ both historical and prospective third party data and data unique to the relevant team as well as consideration of a variety of other tangential variables, including, likely weather patterns, how well the team and other teams in the sport and other sports are performing nationally and locally, other attractions that may draw guests locally during the relevant period, the fan appeal of players on the local team and the visiting team which may increase attendance, the present and historical records of the home and visiting teams, any perceived rivalry between such teams, the point in the season during which the games are being played, the records of the relevant teams at such point and a host of other factors to predict likely receipts or cash flows and to make adjustments on such predictions on a daily, weekly, monthly, or annual basis.

After implementation, and in the course of ongoing use of the method, as gate and vending receipts are actually collected, STAFI provides a system by which the investors are paid on a rolling basis so that they receive a percentage of the gate receipts at the beginning of each month, from the first home games played each month, which satisfy their interest and/or principal payment requirements. The system provides a means thereby in which the entity or team receives enough cash flow to maintain its operations on a short term basis at the beginning of each month, but that also allows for investors to be paid first from those receipts generated at the first part of the month. To the extent such required investor payments exceed gate and vending receipts from a given month, series, or set of games, the system has the optional ability to automatically allocate past unused receipts to cover such shortfalls and adjusts future cash flow predictions to take into account the requirements generated by such shortfalls.

In a further preferred embodiment, STAFI can also be employed to perform any or all of the following computerized steps on a periodic basis (e.g., instantaneous, hourly, daily, weekly, monthly or annual):

store past attendance and food and beverage consumption data of the team and other similar and different professional teams in the local area and league;

forecast future gate and vending receipts on a constantly adjusting basis, adjusted for and correlated to the many variables described above;

receive electronically transmitted records of gate and vending receipts from the team;

identify and allocate a portion of the receipts to pay the obligations to investors in the special purpose vehicle;

allocate a portion of the gate receipts to meet the immediate and future operating needs of the team; and/or adjust the future obligations owed the investors by the amounts already paid them through the special purpose vehicle.

Using the relevant cash flows (e.g., gate and vending receipts and cash flow predictions), STAFI provides the means to create a portfolio of asset backed securities. The asset backed securities will be sold by one or more special purpose vehicles that will be the obligors of the securities. If appropriate, the operation of a STAFI system will incorporate the services of a liquidity and credit enhancer to improve the ratings of the portfolios, provide access to the commercial paper market, add extra funding flexibility and thereby reduce the overall cost of funds.

The STAFI system, and in turn, the special purpose vehicles will or may make use of a variety of securitized financial instruments. The most common are commercial paper and short to medium term notes. To gain access to the commercial paper market, the STAFI system, in one embodiment of the present invention, provides the means to obtain through a commercial bank a liquidity capability to promptly retire the short term maturing commercial paper. Further, to facilitate the requisite AA or better rating that creates a steady demand from the commercial paper market, the STAFI system, as an unknown sponsor of a securitized asset, may require a credit enhancement.

Preferably, each special purpose vehicle will have a clean balance sheet with no liabilities other than the collateralized security. Any fees due to STAFI as services can be subordinated to the interests of the security holders. A collateral agent or trustee will monitor and control the collateralized assets to protect the investors. By utilizing a broad range of financial instruments ranging from commercial paper to medium term notes, STAFI, in one embodiment of the present invention, selects the most appropriate mix to match the term of the underlying collateral assets.

To facilitate the securitization process, STAFI employs a securitization system to manage the treasury functions and to automate most of the administration and accounting required for the special purpose vehicles. The primary function of this system is to provide detailed information and reports to support the sale of marketable securities backed by the cash flows generated by, and the value of, the underlying receipts or cash flows. In addition, this system provides for special purpose vehicle financial management, credit enhancement, and liquidity monitoring facilities. In one embodiment, STAFI utilizes a securitization management system developed by Deloitte & Touche of Wilton, Conn., which, in the preferred embodiment, is the Financial Administration and Structuring Technology (FAST), an integrated issuing entity origination and management software package which addresses the financial and operational aspects of creating and managing an asset securitization entity. FAST is an IBM®PC based system that can also be operated on a PC local area network. FAST guides trading activities, forecasting functions, accounting entries, and management information systems to support pricing and other management decisions. In one preferred embodiment, FAST is modified and customized to streamline the analysis and administration functions for the program features that are unique to STAFI.

What is claimed is:

1. A system for financing a stadium facility, the system comprising a computerized system for:

a) projecting one or more sources of future cash flow expected to be generated by the originating entity in the operation of the facility, said sources being selected from the group consisting of gate receipts, season ticket revenue, individual game ticket revenue, and vending revenue;

b) collecting and pooling rights to receive said cash flow(s) over a period of years;

c) transferring said rights to one or more special purpose vehicles, each in the form of a separate legal entity, in a manner that effectively removes the respective cash flow(s) from the originating entity's bankruptcy estate;

d) issuing securities on behalf of said special purpose vehicle(s), using said pooled rights as collateral; and e) employing the revenue generated from the sale of said securities to finance at least a portion of the construction and/or operating costs of the facility.

2. A system according to claim 1 wherein the system further provides means for predicting the likely dollar amount of the future cash flows and the inherent risks of amounts less those said cash flows being received.

3. A system according to claim 1 further comprising means for insuring that investors in the special purpose vehicle receive the maximum amount possible if cash flows are less than expected, and that they are insured or provided credit enhancement against such risk.

4. A system according to claim 3 wherein the system further comprises one or more risk prediction methodologies to predict the aggregate risk of default by the special purpose vehicle.

5. A system according to claim 1 wherein the system further comprises means for performing a quantitative analysis of the expected cumulative net loss experience or cash flow experience for the securitized asset.

6. A system according to claim 1 wherein the system further comprises means for issuing credit support from an issuer, e.g., in the form of the purchase of a subordinated security in the special purpose vehicle by the seller or overcollateralization.

7. A sports facility the construction of which has been financed, at least in part, by the system of claim 1.

8. A system for financing a stadium facility, the system comprising a computerized system for:
   a) projecting one or more sources of future cash flow expected to be generated by the originating entity in the operation of the facility, said sources being selected from the group consisting of gate receipts, season ticket revenue, individual game ticket revenue, and vending revenue;
   b) collecting and pooling rights to receive said cash flow(s) over a period of years;
   c) transferring said rights to one or more special purpose vehicles, each in the form of a separate legal entity, in a manner that effectively removes the respective cash flow(s) from the originating entity's bankruptcy estate;
   d) issuing securities on behalf of said special purpose vehicle(s), using said pooled rights as collateral; and
   e) employing the revenue generated from the sale of said securities to finance at least a portion of the construction and/or operating costs of the facility
   wherein the system further comprises:
      means for insuring that investors in the special purpose vehicle receive the maximum amount possible if cash flows are less than expected, and that they are insured or provided credit enhancement against such risk, and
      means for predicting the likely dollar amount of the future cash flows and the inherent risks of amounts less those cash flows being received.

9. A system according to claim 8 further comprising one or more risk prediction methodologies to predict the aggregate risk of default by the special purpose vehicle.

10. A system according to claim 9 further comprising means for performing a quantitative analysis of the expected cumulative net loss experience or cash flow experience for the securitized asset.

11. A system according to claim 10 further comprising means for issuing credit support from an issuer.

12. A system for financing a stadium facility, the system comprising a computerized system for:
   a) projecting one or more sources of future cash flow expected to be generated by the originating entity in the operation of the facility, said sources being selected from the group consisting of gate receipts, season ticket revenue, individual game ticket revenue, and vending revenue;
   b) collecting and pooling rights to receive said cash flow(s) over a period of years;
   c) transferring said rights to one or more special purpose vehicles, each in the form of a separate legal entity, in a manner that effectively removes the respective cash flow(s) from the originating entity's bankruptcy estate;
   d) issuing securities on behalf of said special purpose vehicle(s), using said pooled rights as collateral; and
   e) employing the revenue generated from the sale of said securities to finance at least a portion of the construction and/or operating costs of the facility
   wherein the system further comprises:
      means for issuing credit support from an issuer, and
      means for performing a quantitative analysis of the expected cumulative net loss experience or cash flow experience for the securitized asset.

13. A system according to claim 12 further comprising means for insuring that investors in the special purpose vehicle receive the maximum amount possible if cash flows are less than expected, and that they are insured or provided credit enhancement against such risk.

14. A system according to claim 12 further comprising means for predicting the likely dollar amount of the future cash flows and the inherent risks of amounts less those cash flows being received.

15. A system according to claim 12 further comprising one or more risk prediction methodologies to predict the aggregate risk of default by the special purpose vehicle.

16. A sports facility the construction of which has been financed, at least in part, by the system of claim 8.

17. A sports facility the construction of which has been financed, at least in part, by the system of claim 12.

* * * * *